(12) United States Patent
Sato

(10) Patent No.: US 8,311,080 B2
(45) Date of Patent: Nov. 13, 2012

(54) MOBILE COMMUNICATION TERMINAL, SYNCHRONIZATION JUDGING CIRCUIT USED IN THE MOBILE COMMUNICATION TERMINAL, CONTROL METHOD, SYNCHRONIZATION JUDGING CONTROL PROGRAM

(75) Inventor: Kazunori Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 1080 days.

(21) Appl. No.: 12/225,705

(22) PCT Filed: Mar. 27, 2007

(86) PCT No.: PCT/JP2007/056446
§ 371 (c)(1),
(2), (4) Date: Sep. 29, 2008

(87) PCT Pub. No.: WO2007/116757
PCT Pub. Date: Oct. 18, 2007

(65) Prior Publication Data
US 2009/0268785 A1 Oct. 29, 2009

(30) Foreign Application Priority Data
Mar. 31, 2006 (JP) .................................. 2006-101261

(51) Int. Cl.
*H04B 1/00* (2006.01)
(52) U.S. Cl. ....................................................... 375/147
(58) Field of Classification Search .................. 375/130, 375/141, 145, 147, 148, 149, 150, 227, 295, 375/324, 345, 354; 455/127.1, 133, 436, 455/522, 572
See application file for complete search history.

(56) References Cited

U.S. PATENT DOCUMENTS

| 5,774,810 | A | 6/1998 | Sugi |
| 7,336,751 | B2 | 2/2008 | Harada et al. |
| 2002/0048315 | A1* | 4/2002 | Hanada et al. ............... 375/145 |

(Continued)

FOREIGN PATENT DOCUMENTS

JP         9-18404        1/1997

(Continued)

OTHER PUBLICATIONS

3GPP standard [TS25.331 8.5.6 Radio link failure criteria and actions upon radio link failure], Dated Dec. 2007.

(Continued)

*Primary Examiner* — David C. Payne
*Assistant Examiner* — Syed Haider
(74) *Attorney, Agent, or Firm* — McGinn IP Law Group, PLLC

(57) ABSTRACT

Disclosed is a mobile communication terminal employing a code division multiple access scheme, in which when it is decided that the common channel level is equal to or higher than a third threshold (common channel level threshold), an RLF decision control unit compares the SIR data with a first threshold and a second threshold to decide in sync state/out-of sync state between the local spread code and the reception spread code and outputs the decision signal. When it is decided that the common channel level is lower than the third threshold, the first threshold and the second threshold are set to the same value. In this state, when it is decided that the level of the SIR data is lower than the first threshold (=second threshold), the decision signal corresponding to an out-of sync state is output immediately after a predetermined delay time elapses, thereby reducing the power dissipation.

27 Claims, 5 Drawing Sheets

U.S. PATENT DOCUMENTS

| | | | |
|---|---|---|---|
| 2003/0103577 A1* | 6/2003 | Harada et al. | 375/295 |
| 2004/0110477 A1* | 6/2004 | Nishimura et al. | 455/127.1 |
| 2004/0259583 A1* | 12/2004 | Yamada | 455/522 |
| 2005/0075122 A1* | 4/2005 | Lindoff et al. | 455/522 |
| 2005/0185744 A1* | 8/2005 | Sato | 375/354 |

FOREIGN PATENT DOCUMENTS

| | | |
|---|---|---|
| JP | 2002-101006 | 4/2002 |
| JP | 2003-169018 | 6/2003 |
| JP | 2005-253055 | 9/2005 |

OTHER PUBLICATIONS

PCT/IB/326, Dated Oct. 9, 2008.
PCT/IB/373, Dated Oct. 21, 2008.
PCT/ISA/237 with English-Language Translation, Dated Jun. 19, 2007.

* cited by examiner

US 8,311,080 B2

MOBILE COMMUNICATION TERMINAL, SYNCHRONIZATION JUDGING CIRCUIT USED IN THE MOBILE COMMUNICATION TERMINAL, CONTROL METHOD, SYNCHRONIZATION JUDGING CONTROL PROGRAM

TECHNICAL FIELD

The present invention relates to a mobile communication terminal, a synchronization decision circuit used in the mobile communication terminal, a control method, and a synchronization decision control program, and more particularly to a mobile communication terminal, a synchronization decision circuit used in the mobile communication terminal, a control method, and a synchronization decision control program that are advantageously applicable to a mobile phone conforming to the 3GPP (3rd Generation Partnership Project) standard provided for compatibility with the specifications of the third-generation mobile communication system.

BACKGROUND ART

Recently, a communication system using the W-CDMA (Wideband Code Division Multiple Access) scheme is developed as third-generation mobile communication means, and services such as voice communication and packet communication are provided from an OSI (Open Systems Interconnection) protocol based mobile communication network to mobile communication terminals such as a mobile phone. On a mobile communication terminal such as a mobile phone corresponding to the W-CDMA scheme, the SIR(Signal to Interference Ratio) is used as a parameter for deciding the state of synchronization between the local spread code allocated to a local terminal and the reception spread code of a received signal. In this case, if the SIR of the received signal falls below a pre-set fixed threshold for a predetermined number of frames continuously, in the mobile communication terminal, it is decided that the reception spread code and the local spread code are in an out-of sync state.

Conventionally, a mobile phone of this type comprises a common channel level measuring unit 1, a received data decoding unit 2, an individual channel level measuring unit 3, and an RLF (Radio Link Failure) decision control unit 4, as shown in FIG. 5. On this mobile phone, a radio signal transmitted from a radio base station is received by a radio unit, not shown, and received data 'in' is sent from the RF unit. The level of the common channel (that is, pilot signal, Common Pilot Channel, CPICH) of the received signal 'in' is measured by the common channel level measuring unit 1, and the common channel level 'a' is output from the common channel level measuring unit 1.

In the received data decoding unit 2, a reception spread code of the received data 'in' is de-spread using the local spread code, allocated to the local terminal, and demodulated to produce information signal (baseband signal) 'c' of the individual channel. The level of the information signal 'c' is measured by the individual channel level measuring unit 3, and the SIR data 'd' is output from the individual channel level measuring unit 3. In the RLF decision control unit 4, a first threshold corresponding to an in sync state between the local spread code and the reception spread code, and a second threshold corresponding to an out-of sync state are set. If the common channel level 'a' is equal to or higher than a predetermined threshold, the RLF decision control unit 4 compares the SIR data 'd' with the first threshold and with the second threshold, for deciding in sync state or out-of sync state between the local spread code and the reception spread code, and outputs the decision signal 'e'. The decision signal 'e' is sent to an individual channel processing unit not shown.

In addition to the mobile phone described above, the conventional, related technologies are described, for example, in the documents given below.

A receiving device and a sending device used in a spread spectrum communication system described in Patent Document 1 comprise a correlation/synchronization decision unit that decides the synchronization using the correlation between a received spreading signal and a spreading code, an RSSI (Receive Signal Strength Indicator) value detection unit that detects the radio wave strength of the received signal, and a BER measuring unit that measures the BER (Bit Error Rate) of the received signal. Based on the acquired result, the quality of the communication channel currently in use is decided by the terminal interface. Because the BER is taken into consideration in deciding the quality of the communication channel, the decision is made if there is an interference wave or a noise from other channels. When the communication channel quality is poor, the communication channel is moved to maintain the communication quality.

In a synchronization decision control device described in Patent Document 2, an SIR measuring unit measures the SIR based on the received signal. A speed detection unit detects the moving speed of a mobile station. A synchronization decision processing unit determines if the detected moving speed is higher than the speed detection threshold. If it is determined that the detected moving speed is higher than the speed detection threshold, the synchronization decision processing unit changes the SIR threshold to a higher value. If it is determined that the detected moving speed is not higher than the speed detection threshold, the synchronization decision processing unit changes the SIR threshold to a lower value. Further, the synchronization decision processing unit decides synchronization based on the SIR that is measured using the changed SIR threshold as a reference.

Patent Document 1:
Japanese Patent Kokai Publication No. JP-P2002-101006A (Abstract, FIG. 1)

Patent Document 2:
Japanese Patent Kokai Publication No. JP-P2005-253055A (Abstract, FIG. 1)

Non-Patent Document 1:
3GPP standard [TS25.331 8.5.6 Radio link failure criteria and actions upon radio link failure]

SUMMARY OF THE DISCLOSURE

The entire disclosures in the above-mentioned NON-Patent Document and Patent Documents are incorporated herein by reference. The analysis below is given by the present invention.

The conventional mobile phone described above has the following problems.

That is, according to the 3GPP standard described in Non-Patent Document 1, if the RLF decision control unit 4 decides that the level of the SIR data 'd' is higher than the first threshold corresponding to an in sync state, the decision signal 'e' corresponding to an in sync state is output after the delay time set by a timer (time measurement means based on 3GPP standard; T313) elapses. If the level of the SIR data 'd' is lower than the second threshold corresponding to an out-of sync state, the decision signal 'e' corresponding to an out-of sync state is output after the delay time set by the timer elapses. However, if the level of the SIR data 'd' is between the first threshold and the second threshold, the timer (T313) does not operate and, so, a long time elapses until the decision signal 'e' is output. This causes a problem that wasteful power dissipation is generated.

The object of the receiving device and the transmission device described in Patent Document 1 is similar to the object of the present invention. However, in Patent Document 1, since the BER is taken into consideration in deciding the quality of the communication channel and it is decided whether or not there is an interference wave or a noise from other channels, the configuration of Patent Document 1 is different from that of the present invention.

The configuration of the synchronization decision control device described in Patent Document 2 is different from that of the present invention because the synchronization decision processing unit decides the synchronization based on the SIR that is measured with the changed SIR threshold as a reference.

Accordingly, it is an object of the present invention to provide a mobile communication terminal that quickly outputs a decision signal with no wasteful power dissipation even when the level of SIR data is between a first threshold and a second threshold, a synchronization decision circuit used in the mobile communication terminal, a control method, and a synchronization decision control program.

According to a first aspect of the present invention, there is provided a mobile communication terminal comprising:

a demodulation means that demodulates an information signal by de-spreading a reception spread code of a received signal using a local spread code allocated to a local station in accordance with code division multiple access; and a synchronization decision means that decides in sync state or out-of sync state between the local spread code and the reception spread code, wherein the synchronization decision means compares a level of the demodulated information signal with a first threshold corresponding to an in sync state and a second threshold corresponding to an out-of sync state to decide in sync state/out-of sync state and comprises a threshold change setting means that sets the first threshold and the second threshold to the same value when a level of the received signal is lower than a predetermined third threshold.

In accordance with a second aspect of the present invention, which relates to the mobile communication terminal in the first aspect, the threshold change setting means receives a pilot signal, transmitted from a radio base station, as the received signal.

In accordance with a third aspect of the present invention, there is provided a mobile communication terminal comprising a demodulation means that de-spreads a reception spread code of a received signal for demodulation to produce an information signal using a local spread code allocated to a local station in accordance with code division multiple access; and a synchronization decision means that decides in sync state/out-of sync state between the local spread code and the reception spread code, the mobile communication terminal further comprising transmission status decision means that decides output/output stop of a transmission signal from a local station, wherein the synchronization decision means compares a level of the demodulated information signal with a first threshold corresponding to an in sync state and a second threshold corresponding to an out-of sync state to decide in sync state/out-of sync state and comprises a threshold change setting means that sets the first threshold and the second threshold to the same value when the transmission status decision means decides that the transmission status of a transmission signal from a local station is the output stop.

In a fourth aspect of the present invention, the mobile communication terminal in the first, second, or third aspects, wherein the mobile communication terminal is connected wirelessly to a mobile communication network based on the OSI protocol, the mobile communication terminal further comprising a transport format set decision unit that decides a transport format set, corresponding to a transport layer of the OSI protocol, from the information signal demodulated by the demodulation means; and a number of transport-channels decision unit that decides a number of transport channels corresponding to the transport layer from the information signal wherein, with a transport format set decision condition and a number of transport channels, corresponding to the transport layer, stored in advance as a start condition, the threshold change setting means is started when the start condition is satisfied by the transport format set decision unit and the number of transport-channels decision unit.

In a fifth aspect of the present invention, there is provided a synchronization decision circuit that is used in a mobile communication terminal comprising a demodulation means that de-spreads a reception spread code of a received signal for demodulation to produce an information signal using a local spread code allocated to a local station in accordance with code division multiple access and that decides if the local spread code and the reception spread code are in an in sync state or an out-of sync state and outputs a decision signal, wherein the synchronization decision circuit compares a level of the demodulated information signal with a first threshold corresponding to an in sync state and a second threshold corresponding to an out-of sync state to decide in sync state/out-of sync state and that the synchronization decision circuit comprises a threshold change setting means that sets the first threshold and the second threshold to the same value when a level of the received signal is lower than a predetermined third threshold.

In a sixth aspect of the present invention which relates to the synchronization decision circuit in the fifth aspect, the threshold change setting means receives a pilot signal, transmitted from a radio base station, as the received signal.

In a seventh aspect of the present invention, there is provided a synchronization decision circuit that is used in a mobile communication terminal, comprising a demodulation means that de-spreads a reception spread code of a received signal for demodulation to produce an information signal using a local spread code allocated to a local station in accordance with code division multiple access and that decides if the local spread code and the reception spread code are in an in sync state or a out-of sync state and outputs a decision signal, the mobile communication terminal further comprising transmission status decision means that decides output/output stop of a transmission signal from a local station, wherein the synchronization decision circuit compares a level of the demodulated information signal with a first threshold corresponding to an in sync state and a second threshold corresponding to an out-of sync state to decide in sync state/out-of sync state and comprises a threshold change setting means that sets the first threshold and the second threshold to the same value when the transmission status decision means decides that the transmission status of a transmission signal from a local station is the output stop.

In an eighth aspect of the present invention which relates to the synchronization decision circuit in the fifth, sixth, or seventh aspects, the mobile communication terminal is connected wirelessly to a mobile communication network based on the OSI protocol, wherein the mobile communication terminal further comprising a transport format set decision unit that decides a transport format set, corresponding to a transport layer of the OSI protocol, from the information signal demodulated by the demodulation means; and a number of transport-channels decision unit that decides a number of transport channels corresponding to the transport layer from the information signal wherein, with a transport format set decision condition and a number of transport channels, corresponding to the transport layer, stored in advance as a start condition, the threshold change setting means is started when the start condition is satisfied by the transport format set decision unit and the number of transport-channels decision unit.

In a ninth aspect of the present invention, there is provided a control method of a mobile communication terminal comprising a demodulation means that de-spreads a reception spread code of a received signal for demodulation to produce an information signal using a local spread code allocated to a local station in accordance with code division multiple access; and a synchronization decision means that decides if the local spread code and the reception spread code are in an in sync state or an out-of sync state and outputs a decision signal, wherein the synchronization decision means compares a level of the demodulated information signal with a first threshold corresponding to an in sync state and a second threshold corresponding to an out-of sync state to decide in sync state/out-of sync state and performs threshold change setting processing that sets the first threshold and the second threshold to the same value when a level of the received signal is lower than a predetermined third threshold.

In a tenth aspect of the present invention which relates to the control method in the ninth aspect, the threshold change setting processing receives a pilot signal, transmitted from a radio base station, as the received signal.

In an eleventh aspect of the present invention, there is provided a control method of a mobile communication terminal comprising a demodulation means that de-spreads a reception spread code of a received signal for demodulation to produce an information signal using a local spread code allocated to a local station in accordance with code division multiple access; and a synchronization decision means that decides if the local spread code and the reception spread code are in an in sync state or an out-of sync state and outputs a decision signal, the control method further comprising:

a transmission status deciding processing that decides output/output stop of a transmission signal from a local station, wherein the synchronization decision means compares a level of the demodulated information signal with a first threshold corresponding to an in sync state and a second threshold corresponding to an out-of sync state to decide in sync state/out-of sync state and performs threshold change setting processing that sets the first threshold and the second threshold to the same value if the transmission status deciding processing decides that the transmission status of a transmission signal from a local station is the output stop.

In accordance with twelfth aspect of the present invention which relates to the control method in the ninth, tenth, or eleventh aspects, the mobile communication terminal is connected wirelessly to a mobile communication network based on the OSI protocol, the control method further performing transport format set deciding processing that decides a transport format set, corresponding to a transport layer of the OSI protocol, from the information signal demodulated by the demodulation means; and number-of-transport-channels deciding processing that decides a number of transport channels, corresponding to the transport layer, from the information signal wherein, with a transport format set decision condition and a number of transport channels, corresponding to the transport layer, stored in advance as a start condition, the threshold change setting processing is started when the start condition is satisfied by the transport format set deciding processing and the number-of-transport-channels deciding processing.

In a thirteenth aspect of the present invention, there is provided a synchronization decision control program that causes a computer to control the mobile communication terminal in one of the first to fourth aspects.

According to the configuration of the present invention, because a second threshold is set to the same value as that of a first threshold if it is decided that the level of a received signal is lower than a third threshold, the decision signal corresponding to an out-of sync state is output immediately after a predetermined delay time elapses, if it is decided that the level of the demodulated information signal is lower than the second threshold (=first threshold). So, the power dissipation can be reduced. In addition, because the second threshold is set to the same value as that of the first threshold if the transmission status decision means decides the output stop of the transmission signal, the decision signal corresponding to an out-of sync state is output immediately after a predetermined delay time elapses if it is decided that the level of the demodulated information signal is lower than the second threshold (=first threshold). So, the power dissipation can be reduced.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

PREFERRED MODES OF THE INVENTION

The present invention provides a mobile communication terminal a synchronization decision circuit used in the mobile communication terminal, a control method, and a synchronization decision control program, in which a first threshold corresponding to an in sync state and a second threshold corresponding to a out-of sync state are set to the same value, when it is decided that the decision of synchronization between the local spread code and the reception spread code will take time.

First Exemplary Embodiment

Figure 1:
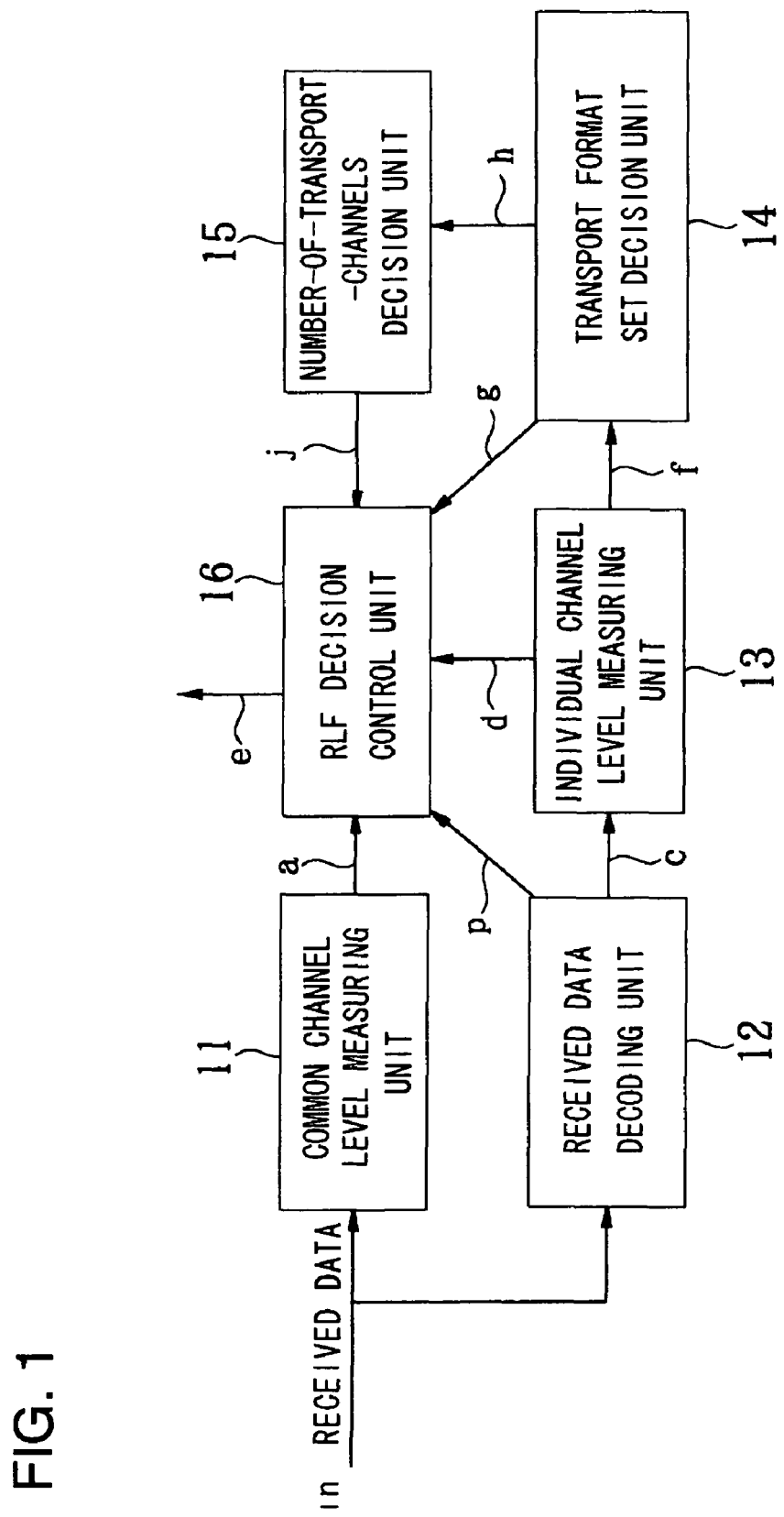
FIG. 1 is a block diagram showing the electrical configuration of main parts of a mobile communication terminal in a first exemplary embodiment of the present invention.

FIG. 1 is a block diagram showing the electrical configuration of the main parts of a mobile communication terminal in a first exemplary embodiment of the present invention. The mobile communication terminal in this exemplary embodiment is a mobile phone connected wirelessly to an OSI protocol based mobile communication network. As shown in the figure, the mobile communication terminal comprises a common channel level measuring unit 11, a received data decoding unit 12, an individual channel level measuring unit 13, a transport format set decision unit 14, a number of transport-channels decision unit 15, and an RLF (Radio Link Failure) decision control unit 16. The common channel level measuring unit 11 measures the level of the common channel (that is, pilot signal, Common Pilot Channel, CPICH) of received data 'in' output from a radio unit, not shown, that receives a radio signal from a radio base station. The common channel level measuring unit 11 outputs the common channel level 'a'.

Upon receiving the received data 'in', the received data decoding unit 12 de-spreads the reception spread code using the local spread code, allocated to a local station, and generates demodulated information signal (baseband signal) 'c' of the individual channel. In addition, the received data decoding unit 12 outputs a start signal 'p' to the RLF decision control unit 16. The individual channel level measuring unit 13 measures the level of the information signal 'c' and outputs SIR data 'd'. The individual channel level measuring unit 13 also outputs a transport format set value 'f' corresponding to the transport layer (layer 4) of the OSI protocol based on the information signal 'c'. The transport format set decision unit 14 decides the transport format set (TFS, a set of transport formats used for the transport channel) corresponding to the transport layer of the OSI protocol based on the transport format set value 'f' and outputs the decision result 'g' and the parameter 'h' corresponding to the number of channels of the transport. The number of transport-channels decision unit 15 outputs the number of transport channels 'j' based on the parameter 'h'.

In the RLF decision control unit 16, a first threshold corresponding to an in sync state between the local spread code and the reception spread code and a second threshold corresponding to an out-of sync state are set and, at the same time, the value of the transport format set and the number of transport channels corresponding to the transport layer are set in advance as the start condition. When this start condition is satisfied by the transport format set decision unit 14 and the number of transport-channels decision unit 15, the RLF decision control unit 16 is started. If the common channel level 'a' is equal to or higher than a predetermined third threshold (common channel level threshold), the RLF decision control unit 16 compares the SIR data 'd' with the first threshold and the second threshold to decide in sync state/out-of sync state between the local spread code and the reception spread code and outputs a decision signal 'e'. Especially, if the common channel level 'a' is lower than the third threshold, the RLF decision control unit 16 in this exemplary embodiment sets the first threshold and the second threshold to the same value. The function and processing of the RLF decision control unit 16 may also be implemented based on a synchronization decision control program that is executed on a computer (not shown) constituting the mobile communication terminal. The synchronization decision circuit of the first claim in Claims corresponds to the configuration comprising the RLF decision control unit 16, common channel level measuring unit 11, and individual channel level measuring unit 13 in FIG. 1, threshold change setting means corresponds to the control of the RLF decision control unit 16, and the demodulation means corresponds to the received data decoding unit 12 (demodulation unit). The fourth claim in Claims corresponds to the configuration comprising the transport format set decision unit 14 and the number of transport-channels decision unit 15 in FIG. 1.

Figure 2:
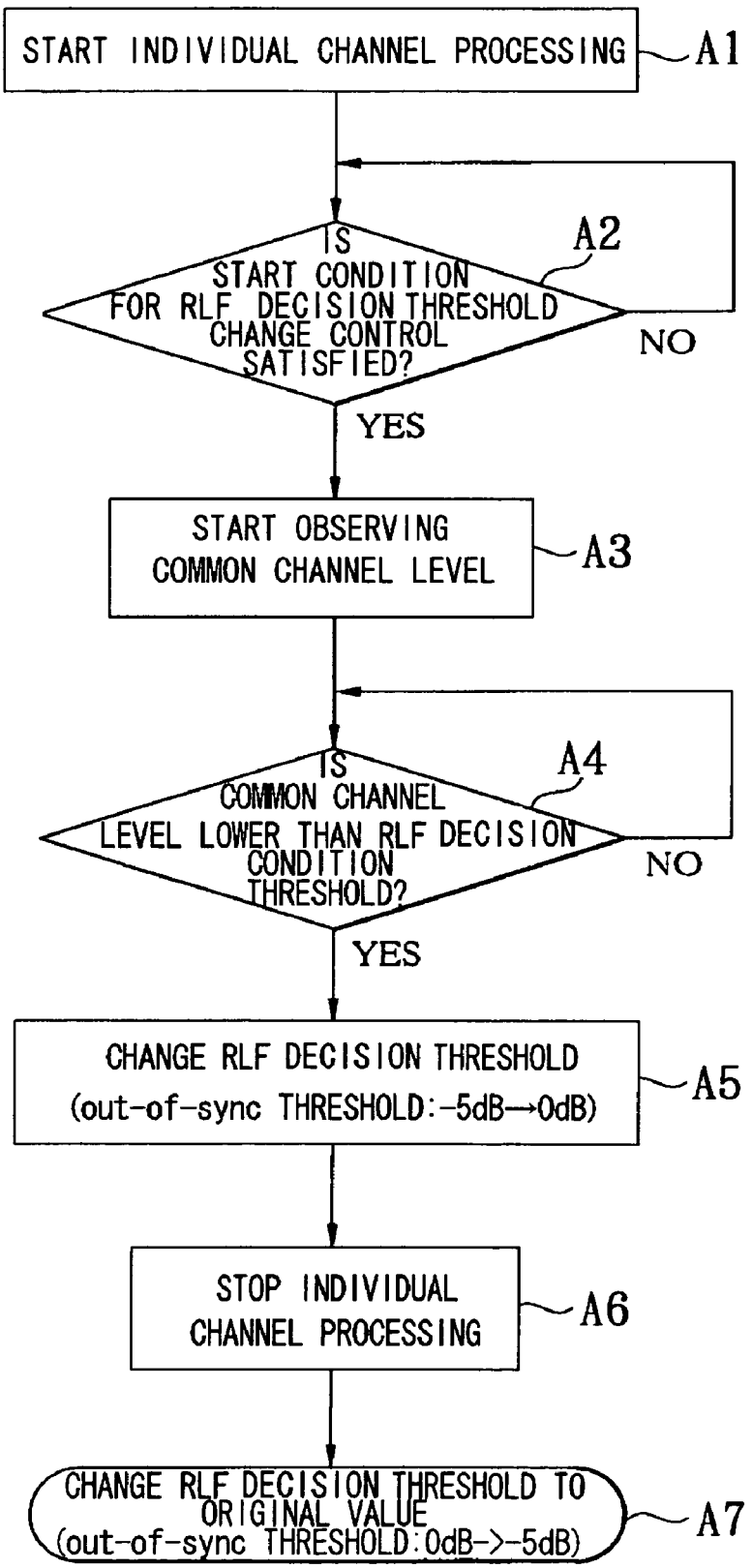
FIG. 2 is a flowchart showing the operation of the mobile phone in FIG. 1.

FIG. 2 is a flowchart showing the operation of the mobile phone in FIG. 1. With reference to this figure, the following describes the processing of the control method used in the mobile phone in this exemplary embodiment.

In this mobile phone, if it is decided that the common channel level 'a' is equal to or higher than a predetermined third threshold (common channel level threshold), the RLF decision control unit 16 compares the SIR data 'd' with the first threshold and the second threshold to decide in sync state/out-of sync state between the local spread code and the reception spread code and outputs the decision signal 'e'. Especially, if it is decided that the common channel level 'a' is lower than the third threshold, the RLF decision control unit 16 sets the first threshold and the second threshold are set to the same value (threshold change setting processing).

That is, in the RLF decision control unit 16, the transport format set decision condition corresponding to the transport layer (for example, the transport format TF is a single TF), the number of transport channels (for example, the number of channels is 1), and the common channel level threshold (third threshold, for example, CPICH standard power component—25 dB) are set in advance as the start condition. The start signal 'p' is output from the received data decoding unit 12 to the RLF decision control unit 16 to start the individual channel processing (step A1). The RLF decision control unit 16 decides if the condition for starting the RLF decision threshold change control is satisfied, based on the decision result 'g' of the transport format set deciding processing by the transport format set decision unit 14 and on the number of transport channels 'j' determined as a result of the number-of-transport-channels deciding processing by the number of transport-channels decision unit 15 (step A2).

If this start condition is satisfied, the RLF decision control unit 16 is started. The RLF decision control unit 16 starts observing the common channel level 'a' from the common channel level measuring unit 11 (step A3) and decides whether the common channel level 'a' is lower than the common channel level threshold (step A4). If the common channel level 'a' is lower than the common channel level threshold, the first threshold and the second threshold, both of which are an RLF decision threshold, are set to the same value. For example, when the first threshold corresponding to an in sync state is set to 0 dB and the second threshold corresponding to an out-of sync state (out-of-sync) is set to −5 dB, the second threshold is changed to 0 dB with the result that there is no level difference in the decision condition between an in sync state and an out-of sync state (step A5).

In this state, the RLF decision control unit 16 compares the SIR data from the individual channel level measuring unit 13 with the first threshold (=second threshold) to decide whether the local spread code and the reception spread code are in an in sync state or out-of sync state and, after the delay time of the timer (T313) elapses, immediately outputs the decision signal 'e'. The decision signal 'e' is sent to an individual channel processing unit not shown. In this case, if it is decided that the level of the SIR data 'd' is lower than the first threshold (=second threshold), that is, if it is decided that codes are in an out-of sync state, the decision signal 'e' corresponding to an out-of sync state is output immediately after the delay time described above elapses. After that, when the start signal 'p' from the received data decoding unit 12 becomes a non-active mode and the individual channel processing of the RLF decision control unit 16 is terminated (stopped) (step A6), the second threshold is changed from 0 dB to −5 dB that is the original level and the processing is terminated.

In the first exemplary embodiment, if it is decided that the common channel level 'a' is lower than the third threshold (common channel level threshold), the second threshold is set to the same value as that of the first threshold as described above. So, if it is decided that the level of the SIR data 'd' is lower than the second threshold (=first threshold), the decision signal 'e' corresponding to an out-of sync state is output immediately after the delay time of the timer (T313) elapses. Thus, this configuration reduces the power dissipation. For example, if the time until the decision signal 'e' corresponding to an out-of sync state is output is reduced from conventional five minutes to three minutes, the power dissipation is reduced by 40% depending upon the usage environment.

Second Exemplary Embodiment

Figure 3:
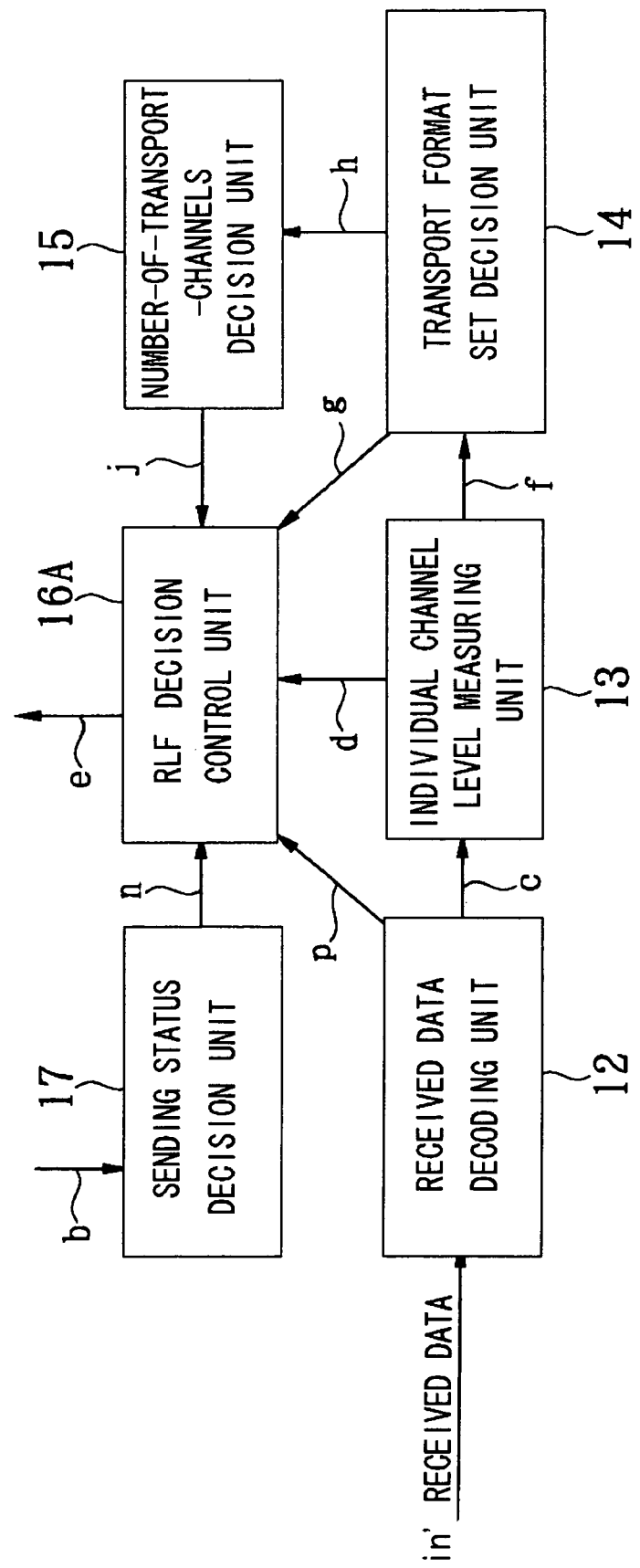
FIG. 3 is a block diagram showing the electrical configuration of a mobile phone in a second exemplary embodiment of the present invention.

FIG. 3 is a block diagram showing the electrical configuration of a mobile phone in a second exemplary embodiment of the present invention, and the same reference numeral is used to denote the same element in FIG. 1 that shows the first exemplary embodiment.

As shown in FIG. 3, the mobile phone in this exemplary embodiment has not the common channel level measuring unit 11 shown in FIG. 1 but has a transmission status decision unit 17. In addition, instead of the RLF decision control unit 16, an RLF decision control unit 16A having different functions is provided. The transmission status decision unit 17 decides whether the transmission signal from this local terminal is output or the output is stopped based on a control signal 'b' received from a control unit, not shown, that controls the transmission/receiving operation, and outputs a decision signal 'n'. Instead of the function that decides the common channel level 'a' of the RLF decision control unit 16, the RLF decision control unit 16A has the function that sets the first threshold and the second threshold to the same value if the decision signal 'n' indicates that output of the transmission signal from the local terminal is stopped. The other part is the same as that shown in FIG. 1.

Figure 4:
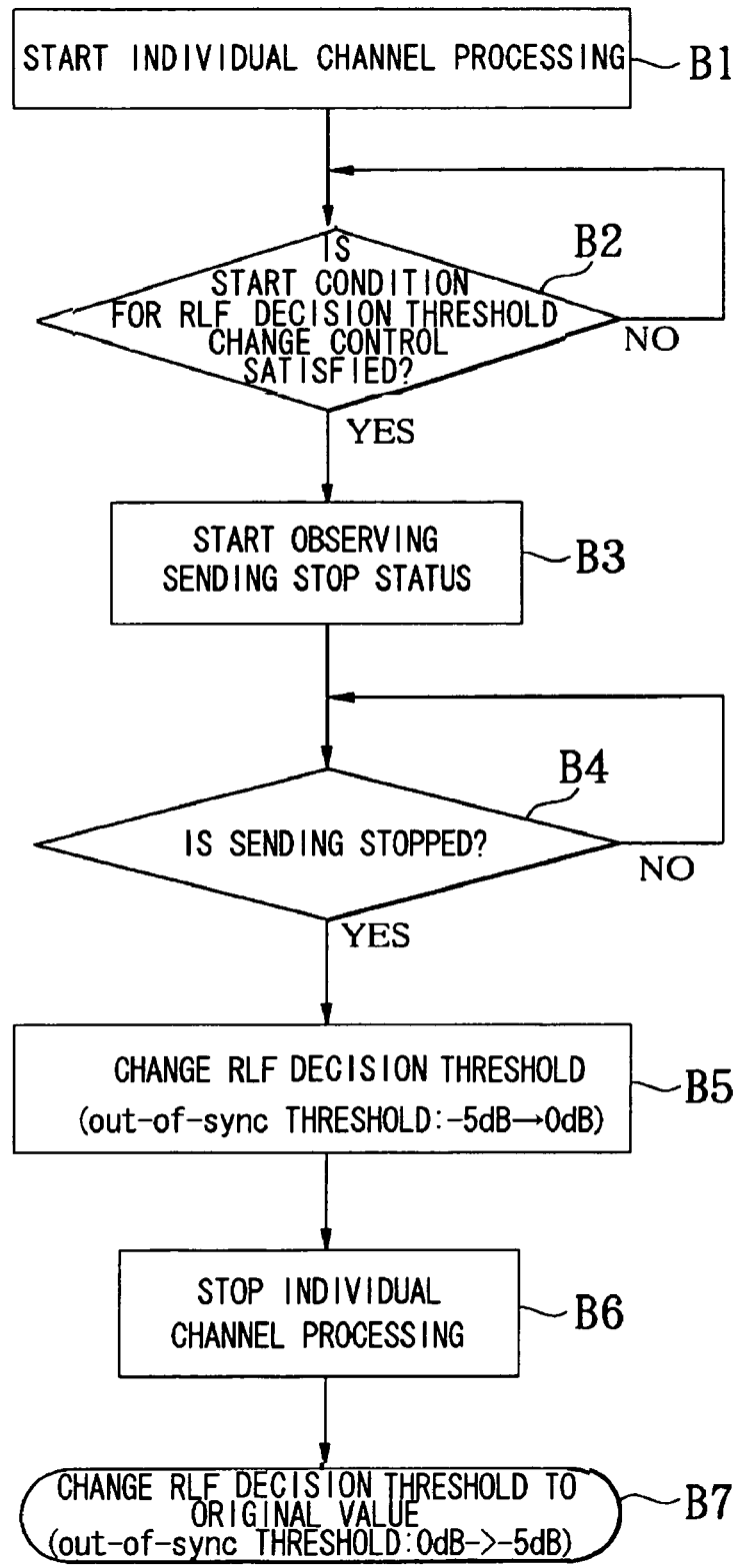
FIG. 4 is a flowchart showing the operation of the mobile phone in FIG. 3.
Figure 5:
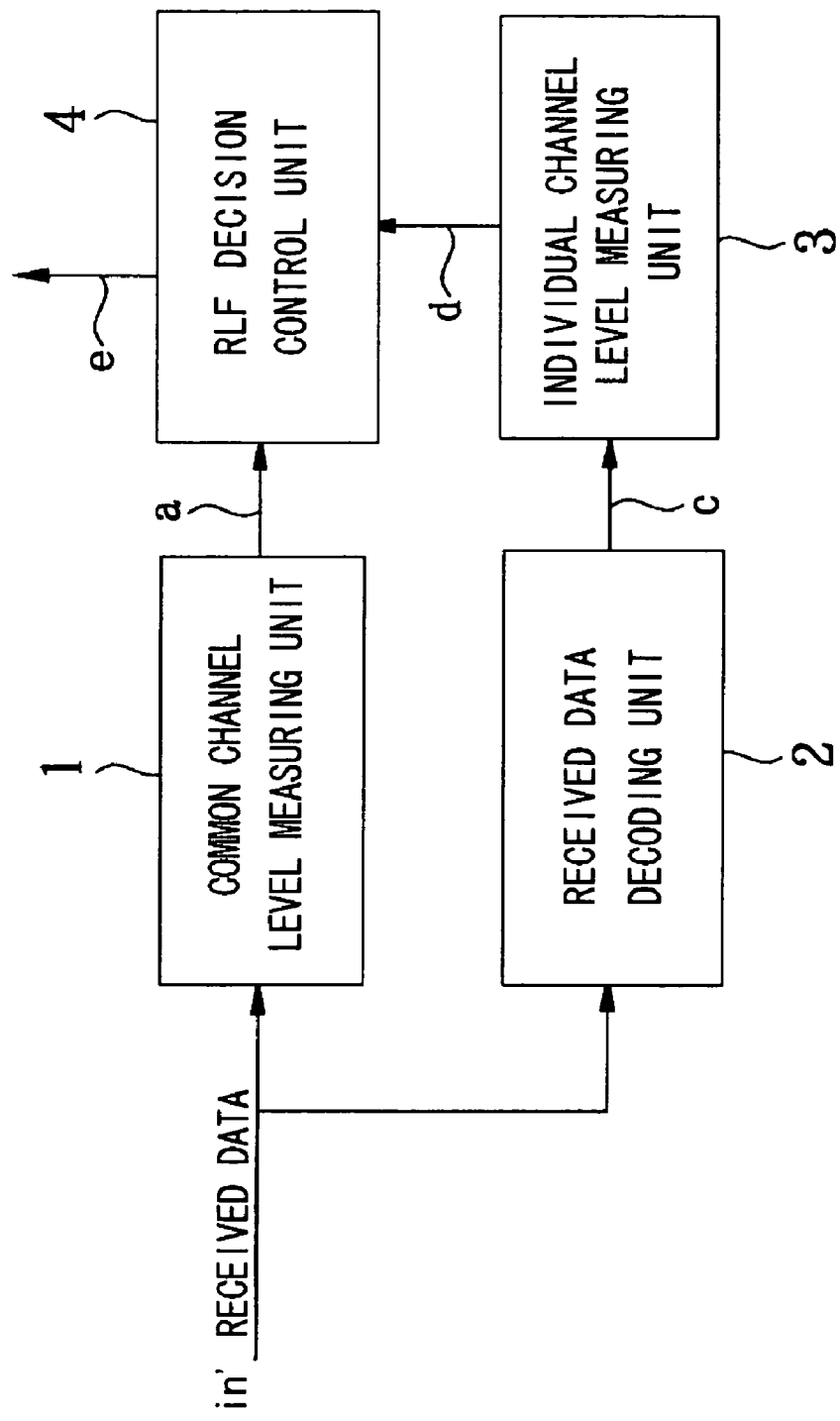
FIG. 5 is a block diagram showing the electrical configuration of a conventional mobile phone.

FIG. 4 is a flowchart showing the operation of the mobile phone in FIG. 3. The following describes the processing of the control method used for the mobile phone in this exemplary embodiment with reference to this figure. In this mobile phone, the transmission status decision unit 17 decides whether the transmission signal from this local terminal is output or the output is stopped (transmission status deciding processing). If it is decided that the transmission signal is output, the RLF decision control unit 16A compares the SIR data 'd' with the first threshold and the second threshold to decide in sync state/out-of sync state between the local spread code and the reception spread code and outputs the decision signal 'e'. If it is decided that the output of the transmission signal is stopped, the RLF decision control unit 16A sets the first threshold and the second threshold to the same value (threshold change setting processing).

That is, in the RLF decision control unit 16A, the transport format set decision condition corresponding to the transport layer (for example, the transport format TF is a single TF) and the number of transport channels (for example, the number of channels is 1) are set in advance as the start condition. And, the start signal 'p' is output from the received data decoding unit 12 to the RLF decision control unit 16A to start the individual channel processing (step B1). The RLF decision control unit 16A decides if the condition for starting the RLF decision threshold change control is satisfied, based on the decision result 'g' of the transport format set deciding processing by the transport format set decision unit 14 and on the number of transport channels 'j' determined as a result of the number-of-transport-channels deciding processing by the number of transport-channels decision unit 15 (step B2).

If this start condition is satisfied, the RLF decision control unit 16A is started. The RLF decision control unit 16A starts observing the transmission stop status based on the decision signal 'n' received from the transmission status decision unit 17 (step B3) and decide if the transmission is stopped (step B4). If the transmission is stopped, the first threshold and the second threshold, both of which are an RLF decision threshold, are set to the same value. For example, when the first threshold corresponding to an in sync state is set to 0 dB and the second threshold corresponding to an out-of sync state is set to −5 dB, the second threshold is changed to 0 dB with the result that there is no level difference in the decision condition between an in sync state and an out-of sync state (step B5).

In this state, the RLF decision control unit 16A compares the SIR data from the individual channel level measuring unit 13 with the first threshold (=second threshold) to decide in sync state/out-of sync state between the local spread code and the reception spread code and, as in the first exemplary embodiment, outputs the decision signal 'e'. The decision signal 'e' is sent to an individual channel processing unit not shown. After that, when the start signal 'p' from the received data decoding unit 12 becomes a non-active mode and the individual channel processing of the RLF decision control unit 16A is terminated (stopped) (step B6), the second threshold is changed from 0 dB to −5 dB that is the original level and the processing is terminated.

In the second exemplary embodiment, if the transmission status decision unit 17 decides that the output of the transmission signal is stopped, the second threshold is set to the same value as that of the first threshold as in the first exemplary embodiment as described above. So, if it is decided that the level of the SIR data 'd' is lower than the second threshold, the decision signal 'e' corresponding to an out-of sync state is output immediately after the delay time of the timer (T313) elapses. Thus, this configuration reduces the power dissipation.

While the exemplary embodiments of the present invention have been described with reference to the drawings, it is to be understood that the actual configuration of the present invention is not limited to the exemplary embodiments and that changes in the design within the scope of the spirit of the present invention, if any, are included in the present invention.

For example, when the first threshold and the second threshold are set to the same value, the first threshold and the second threshold may be set to the same value that is not limited to the value used in the exemplary embodiments described above. The present invention is applicable not only to a mobile phone but also to general mobile communication terminals that use the CDMA method and W-CDMA scheme such as a PDA (Personal Digital Assistants) or a car navigation system.

INDUSTRIAL APPLICABILITY

The present invention is applicable to general mobile communication terminals that use the CDMA method and the W-CDMA scheme. In particular, the present invention is useful in a place where the environment of radio communication with a radio base station is degraded.

The invention claimed is:
1. A synchronization decision circuit, comprising:
 a synchronization decision unit that receives an information signal from a demodulation unit that de-spreads a reception spread code of a received signal for a demodulation to produce the information signal, using a local spread code which is allocated to a local terminal in accordance with a code division multiple access, the synchronization decision unit measuring a level of the information signal to calculate an SIR (Signal to Interference Ratio) data and comparing the SIR data with a first threshold and a second threshold, corresponding respectively to an in sync state and an out-of sync state between the local spread code and the reception spread code, to decide if the local spread code and the reception spread code are in the in sync state or the out-of sync state, and to output a decision signal; and a threshold change setting unit that sets the first threshold and the second threshold to a same value when a level of the received signal is lower than a predetermined third threshold.

2. The synchronization decision circuit as defined in claim 1, wherein the threshold change setting unit receives a pilot signal as the received signal, transmitted from a radio base station.

3. A synchronization decision circuit, comprising:

a synchronization decision unit that receives an information signal from a demodulation unit that de-spreads a reception spread code of a received signal for a demodulation to produce the information signal, using a local spread code allocated to a local terminal in accordance with a code division multiple access, the synchronization decision unit measuring a level of the information signal to calculate an SIR (Signal to Interference Ratio) data and comparing the SIR data with a first threshold and a second threshold, corresponding respectively to an in sync state and an out-of sync state between the local spread code and the reception spread code, to decide if the local spread code and the reception spread code are in the in sync state or the out-of sync state, and to output a decision signal; and a threshold change setting unit that sets the first threshold and the second threshold to a same value when a transmission status of a transmission signal from a local station indicates an output stop.

4. The synchronization decision circuit as defined in claim 1, wherein the local terminal is connected wirelessly to a mobile communication network based on an OSI (Open Systems Interconnection) protocol, the local terminal further comprising:

a transport format set decision unit that decides a transport format set, corresponding to a transport layer of the OSI protocol, from the information signal demodulated by the demodulation unit; and a number of transport-channels decision unit that decides a number of transport channels corresponding to the transport layer from the information signal, wherein, with a transport format set decision condition and a number of transport channels, corresponding to the transport layer, stored in advance as a start condition, the threshold change setting unit is started, when the start condition is satisfied by the transport format set decision unit and the number of transport-channels decision unit.

5. A mobile communication terminal, comprising:

a demodulation unit that de-spreads a reception spread code of a received signal for a demodulation to produce an information signal, using a local spread code allocated to a local station in accordance with a code division multiple access; and a synchronization decision unit that receives the information signal from the demodulation unit, the synchronization decision unit measuring a level of the information signal to calculate an SIR (Signal to Interference Ratio) data and comparing the SIR data with a first threshold and a second threshold, corresponding respectively to an in sync state and an out-of sync state between the local spread code and the reception spread code, to decide if the local spread code and the reception spread code are in the in sync state or the out-of sync state, and to output a decision signal, the synchronization decision unit including:

a threshold change setting unit that sets the first threshold and the second threshold to a same value when a level of the received signal is lower than a predetermined third threshold.

6. A mobile communication terminal, comprising:

a demodulation means that de-spreads a reception spread code of a received signal for a demodulation to produce an information signal, using a local spread code allocated to a local station in accordance with a code division multiple access; and a synchronization decision unit that receives the information signal from the demodulation means, measures a level of the information signal to calculate an SIR (Signal to Interference Ratio) data and compares the SIR data with a first threshold and a second threshold, corresponding respectively to an in sync state and an out-of sync state between the local spread code and the reception spread code, to decide if the local spread code and the reception spread code are in the in sync state or the out-of sync state, and outputting a decision signal; and a transmission status decision unit that decides if a transmission status of a transmission signal from a local station is an output or an output stop, the synchronization decision unit including:

a threshold change setting unit that sets the first threshold and the second threshold to a same value when the transmission status of the transmission signal from the local station indicates the output stop.

7. A control method for use on a mobile communication terminal, the method comprising:

de-spreading a reception spread code of a received signal for a demodulation to produce an information signal, using a local spread code allocated to a local station in accordance with a code division multiple access;

responsive to the demodulated information signal, measuring a level of the information signal to calculate an SIR (Signal to Interference Ratio) data and comparing the SIR data with a first threshold and a second threshold, corresponding respectively to an in sync state and an out-of sync state between the local spread code and the reception spread code, to decide if the local spread code and the reception spread code are in the in sync state or the out-of sync state, and outputting a decision signal; and performing a threshold change setting processing that sets the first threshold and the second threshold to a same value when a level of the received signal is lower than a predetermined third threshold.

8. The control method as defined in claim 7, wherein the threshold change setting processing receives a pilot signal, transmitted from a radio base station, as the received signal.

9. A control method for use on a mobile communication terminal, the method comprising:

de-spreading a reception spread code of a received signal for a demodulation to produce an information signal, using a local spread code allocated to a local station in accordance with a code division multiple access;

responsive to the demodulated information signal, measuring a level of the information signal to calculate an SIR (Signal to Interference Ratio) data and comparing the SIR data with a first threshold and a second threshold, corresponding respectively to an in sync state and an out-of sync state between the local spread code and the reception spread code, to decide if the local spread code and the reception spread code are in the in sync state or the out-of sync state, and outputting a decision signal; and performing a threshold change setting processing that sets the first threshold and the second threshold to a same value when the transmission status deciding processing decides that a transmission status of a transmission signal from the local station is an output stop.

10. The control method as defined claim 7, wherein the mobile communication terminal is connected wirelessly to a mobile communication network based on an OSI (Open Systems Interconnection) protocol, the control method further comprising:

performing transport format set deciding processing that decides a transport format set, corresponding to a transport layer of the OSI protocol, from the information signal demodulated by a demodulation unit; and performing a number-of-transport-channels deciding processing that decides a number of transport channels corresponding to the transport layer from the information signal, wherein, with a transport format set decision condition and a number of transport channels, corresponding to the transport layer, stored as a start condition in advance, the threshold change setting processing is started when the start condition is satisfied by a decision result of the transport format set deciding processing and a decision result of the number-of-transport-channels deciding processing.

11. A non-transitory storage device storing a computer program causing a computer constituting a mobile communication terminal which comprises:

a demodulation unit that de-spreads a reception spread code of a received signal for a demodulation to produce an information signal, using a local spread code allocated to a local station in accordance with a code division multiple access; and a synchronization decision unit that decides if the local spread code and the reception spread code are in an in sync state or an out-of sync state and outputs a decision signal, to execute, as a processing of the synchronization decision unit:

a processing of measuring a level of the information signal to calculate an SIR (Signal to Interference Ratio) data and comparing the SIR data with a first threshold corresponding to an in sync state and a second threshold corresponding to an out-of sync state to decide if the local spread code and the reception spread code are in the in sync state or the out-of sync state; and a threshold change setting processing that sets the first threshold and the second threshold to a same value when a level of the received signal is lower than a predetermined third threshold.

12. The non-transitory storage device as defined in claim 11, wherein the threshold change setting processing receives a pilot signal, transmitted from a radio base station, as the received signal.

13. A non-transitory storage device storing a computer program causing a computer constituting a mobile communication terminal which comprises:

a demodulation unit that de-spreads a reception spread code of a received signal for a demodulation to produce an information signal, using a local spread code allocated to a local station in accordance with a code division multiple access;

a synchronization decision unit that decides if the local spread code and the reception spread code are in an in sync state or an out-of sync state and outputs a decision signal; and a transmission status decision unit that decides if a transmission status of a transmission signal from a local station is an output or an output stop, to execute, as a processing of the synchronization decision unit:

a processing of measuring a level of the information signal to calculate an SIR (Signal to Interference Ratio) data and comparing the SIR data with a first threshold corresponding to an in sync state and a second threshold corresponding to an out-of sync state to decide if the local spread code and the reception spread code are in the in sync state or the out-of sync state; and a threshold change setting processing that sets the first threshold and the second threshold to a same value when the transmission status decision unit decides that the transmission status of the transmission signal from the local station is the output stop.

14. The non-transitory storage device as defined in claim 11, wherein the mobile communication terminal is connected wirelessly to a mobile communication network based on an OSI (Open Systems Interconnection) protocol, wherein the program further comprises instructions for:

a transport format set deciding processing that decides a transport format set, corresponding to a transport layer of the OSI protocol, from the information signal demodulated by the demodulation unit; and a number-of-transport-channels deciding processing that decides a number of transport channels corresponding to the transport layer from the information signal, and wherein, with a transport format set decision condition and a number of transport channels, corresponding to the transport layer, stored as a start condition in advance, the threshold change setting process is started when the start condition is satisfied by a decision result of the transport format set deciding processing and a decision result of the number-of-transport-channels deciding processing.

15. The mobile communication terminal according to claim 5, wherein the threshold change setting unit receives a pilot signal as the received signal, transmitted from a radio base station.

16. The mobile communication terminal according to claim 5, wherein the terminal is connected wirelessly to a mobile communication network based on an OSI (Open Systems Interconnection) protocol, the terminal further comprising:

a transport format set decision unit that decides a transport format set, corresponding to a transport layer of the OSI protocol, from the information signal demodulated by the demodulation unit; and a number of transport-channels decision unit that decides a number of transport channels corresponding to the transport layer from the information signal, wherein, with a transport format set decision condition and a number of transport channels, corresponding to the transport layer, stored in advance as a start condition, the threshold change setting unit is started, when the start condition is satisfied by the transport format set decision unit and the number of transport-channels decision unit.

17. The mobile communication terminal according to claim 6, wherein the threshold change setting unit receives a pilot signal as the received signal, transmitted from a radio base station.

18. The mobile communication terminal according to claim 6, wherein the terminal is connected wirelessly to a mobile communication network based on an OSI (Open Systems Interconnection) protocol, the terminal further comprising:
 a transport format set decision unit that decides a transport format set, corresponding to a transport layer of the OSI protocol, from the information signal demodulated by the demodulation means; and
 a number of transport-channels decision unit that decides a number of transport channels corresponding to the transport layer from the information signal,
 wherein, with a transport format set decision condition and a number of transport channels, corresponding to the transport layer, stored in advance as a start condition, the threshold change setting unit is started, when the start condition is satisfied by the transport format set decision unit and the number of transport channels decision unit.

19. The synchronization decision circuit as defined in claim 2, wherein the local terminal is connected wirelessly to a mobile communication network based on an OSI (Open Systems Interconnection) protocol, the local terminal further comprising:
 a transport format set decision unit that decides a transport format set, corresponding to a transport layer of the OSI protocol, from the information signal demodulated by the demodulation unit; and
 a number of transport-channels decision unit that decides a number of transport channels corresponding to the transport layer from the information signal,
 wherein, with a transport format set decision condition and a number of transport channels, corresponding to the transport layer, stored in advance as a start condition, the threshold change setting unit is started, when the start condition is satisfied by the transport format set decision unit and the number of transport-channels decision unit.

20. The synchronization decision circuit as defined in claim 3, wherein the local terminal is connected wirelessly to a mobile communication network based on an OSI (Open Systems Interconnection) protocol, the local terminal further comprising:
 a transport format set decision unit that decides a transport format set, corresponding to a transport layer of the OSI protocol, from the information signal demodulated by the demodulation unit; and
 a number of transport-channels decision unit that decides a number of transport channels corresponding to the transport layer from the information signal,
 wherein, with a transport format set decision condition and a number of transport channels, corresponding to the transport layer, stored in advance as a start condition, the threshold change setting unit is started, when the start condition is satisfied by the transport format set decision unit and the number of transport-channels decision unit.

21. A synchronization decision circuit, comprising:
 a synchronization decision unit that receives an information signal from a demodulation unit that de-spreads a reception spread code of a received signal for a demodulation to produce the information signal, using a local spread code which is allocated to a local terminal in accordance with a code division multiple access, compares a level of the information signal with a first threshold and a second threshold, corresponding respectively to an in sync state and an out-of sync state between the local spread code and the reception spread code, to decide if the local spread code and the reception spread code are in the in sync state or the out-of sync state, and outputs a decision signal; and
 a threshold change setting unit that sets the first threshold and the second threshold to a same value when a level of the received signal is lower than a predetermined third threshold, wherein the local terminal is connected wirelessly to a mobile communication network based on an OSI (Open Systems Interconnection) protocol, the local terminal further comprising:
 a transport format set decision unit that decides a transport format set, corresponding to a transport layer of the OSI protocol, from the information signal demodulated by the demodulation unit; and
 a number of transport-channels decision unit that decides a number of transport channels corresponding to the transport layer from the information signal,
 wherein, with a transport format set decision condition and a number of transport channels, corresponding to the transport layer, stored in advance as a start condition, the threshold change setting unit is started, when the start condition is satisfied by the transport format set decision unit and the number of transport-channels decision unit.

22. A control method for use on a mobile communication terminal, the method comprising:
 de-spreading a reception spread code of a received signal for a demodulation to produce an information signal, using a local spread code allocated to a local station in accordance with a code division multiple access;
 responsive to the demodulated information signal, comparing a level of the information signal with a first threshold and a second threshold, corresponding respectively to an in sync state and an out-of sync state between the local spread code and the reception spread code, to decide if the local spread code and the reception spread code are in the in sync state or the out-of sync state and outputting a decision signal; and
 performing a threshold change setting processing that sets the first threshold and the second threshold to a same value when a level of the received signal is lower than a predetermined third threshold, wherein the mobile communication terminal is connected wirelessly to a mobile communication network based on an OSI (Open Systems Interconnection) protocol,
 the control method further comprising:
 performing a transport format set deciding processing that decides a transport format set, corresponding to a transport layer of the OSI protocol, from the information signal demodulated by the demodulation unit; and
 performing a number-of-transport-channels deciding processing that decides a number of transport channels corresponding to the transport layer from the information signal,
 wherein, with a transport format set decision condition and a number of transport channels, corresponding to the transport layer, stored as a start condition in advance, the threshold change setting processing is started when the start condition is satisfied by a decision result of the transport format set deciding processing and a decision result of the number-of-transport-channels deciding processing.

23. A non-transitory storage device storing a computer program causing a computer constituting a mobile communication terminal, comprising:
a demodulation unit that de-spreads a reception spread code of a received signal for a demodulation to produce an information signal, using a local spread code allocated to a local station in accordance with a code division multiple access; and
a synchronization decision unit that decides if the local spread code and the reception spread code are in an in sync state or an out-of sync state and outputs a decision signal,
the computer program comprising a sequence of instructions to execute, as the processing of the synchronization decision unit:
a processing of comparing a level of the demodulated information signal with a first threshold corresponding to the in sync state and a second threshold corresponding to the out-of sync state to decide if the local spread code and the reception spread code are in the in sync state or the out-of sync state; and
a threshold change setting processing that sets the first threshold and the second threshold to a same value when a level of the received signal is lower than a predetermined third threshold,
wherein the mobile communication terminal is connected wirelessly to a mobile communication network based on an OSI (Open Systems Interconnection) protocol,
the computer program further comprising instructions for:
a transport format set deciding processing that decides a transport format set, corresponding to a transport layer of the OSI protocol, from the information signal demodulated by the demodulation unit; and
a number-of-transport-channels deciding processing that decides a number of transport channels corresponding to the transport layer from the information signal, and
wherein, with a transport format set decision condition and a number of transport channels, corresponding to the transport layer, stored as a start condition in advance, the threshold change setting processing is started when the start condition is satisfied by a decision result of the transport format set deciding processing and a decision result of the number-of-transport-channels deciding processing.

24. A mobile communication terminal, comprising:
a demodulation unit that de-spreads a reception spread code of a received signal for a demodulation to produce an information signal, using a local spread code allocated to a local station in accordance with a code division multiple access; and
a synchronization decision unit that receives the information signal from the demodulation unit, compares a level of the information signal with a first threshold and a second threshold, corresponding respectively to an in sync state and an out-of sync state between the local spread code and the reception spread code, to decide if the local spread code and the reception spread code are in the in sync state or the out-of sync state, and outputs a decision signal, the synchronization decision unit including:
a threshold change setting unit that sets the first threshold and the second threshold to a same value when a level of the received signal is lower than a predetermined third threshold, wherein the terminal is connected wirelessly to a mobile communication network based on an OSI (Open Systems Interconnection) protocol, the terminal further comprising:
a transport format set decision unit that decides a transport format set, corresponding to a transport layer of the OSI protocol, from the information signal demodulated by the demodulation unit; and
a number of transport-channels decision unit that decides a number of transport channels corresponding to the transport layer from the information signal,
wherein, with a transport format set decision condition and a number of transport channels, corresponding to the transport layer, stored in advance as a start condition, the threshold change setting unit is started, when the start condition is satisfied by the transport format set decision unit and the number of transport-channels decision unit.

25. A mobile communication terminal, comprising:
a demodulation unit that de-spreads a reception spread code of a received signal for a demodulation to produce an information signal, using a local spread code allocated to a local station in accordance with a code division multiple access;
a synchronization decision unit that receives the information signal from a demodulation unit, compares a level of the information signal with a first threshold and a second threshold, corresponding respectively to an in sync state and an out-of sync state between the local spread code and the reception spread code, to decide if the local spread code and the reception spread code are in the in sync state or the out-of sync state, and outputting a decision signal; and
a transmission status decision unit that decides if a transmission status of a transmission signal from a local station is an output or an output stop;
the synchronization decision unit including:
a threshold change setting unit that sets the first threshold and the second threshold to a same value when the transmission status of a transmission signal from a local station indicates the output stop, wherein the terminal is connected wirelessly to a mobile communication network based on an OSI (Open Systems Interconnection) protocol, the terminal further comprising:
a transport format set decision unit that decides a transport format set, corresponding to a transport layer of the OSI protocol, from the information signal demodulated by the demodulation unit; and
a number of transport-channels decision unit that decides a number of transport channels corresponding to the transport layer from the information signal,
wherein, with a transport format set decision condition and a number of transport channels, corresponding to the transport layer, stored in advance as a start condition, the threshold change setting unit is started, when the start condition is satisfied by the transport at set decision unit and the number of transport-channels decision unit.

26. A synchronization decision circuit, comprising:
a synchronization decision unit that receives an information signal from a demodulation unit that de-spreads a reception spread code of a received signal for a demodulation to produce the information signal, using a local spread code which is allocated to a local terminal in accordance with a code division multiple access, compares a level of the information signal with a first threshold and a second threshold, corresponding respectively to an in sync state and an out-of sync state between the local spread code and the reception spread code, to decide if the local spread code and the reception spread code are in the in sync state or the out-of sync state, and outputs a decision signal; and a threshold change setting unit that sets the first threshold and the second threshold to a same value when a level of the received signal is lower than a predetermined third threshold, wherein the threshold change setting unit receives a pilot signal as the received signal, transmitted from a radio base station, wherein the local terminal is connected wirelessly to a mobile communication network based on an OSI (Open Systems Interconnection) protocol, the synchronization decision circuit further comprising:

a transport format set decision unit that decides a transport format set, corresponding to a transport layer of the OSI protocol, from the information signal demodulated by the demodulation unit; and a number of transport-channels decision unit that decides a number of transport channels corresponding to the transport layer from the information signal, wherein, with a transport format set decision condition and a number of transport channels, corresponding to the transport layer, stored in advance as a start condition, the threshold change setting unit is started, when the start condition is satisfied by the transport format set decision unit and the number of transport channels decision unit.

27. A synchronization decision circuit, comprising:

a synchronization decision unit that receives an information signal from a demodulation unit that de-spreads a reception spread code of a received signal for a demodulation to produce the information signal, using a local spread code allocated to a local terminal in accordance with a code division multiple access, compares a level of the information signal with a first threshold and a second threshold, corresponding respectively to an in sync state and an out-of sync state between the local spread code and the reception spread code, to decide if the local spread code and the reception spread code are in the in sync state or the out-of sync state, and outputs a decision signal; and a threshold change setting unit that sets the first threshold and the second threshold to a same value when a transmission status of a transmission signal from a local station indicates an output stop, wherein the terminal is connected wirelessly to a mobile communication network based on an OSI (Open Systems Interconnection) protocol, the synchronization decision circuit further comprising:

a transport format set decision unit that decides a transport format set, corresponding to a transport layer of the OSI protocol, from the information signal demodulated by the demodulation means unit; and a number of transport-channels decision unit that decides a number of transport channels corresponding to the transport layer from the information signal, wherein, with a transport format set decision condition and a number of transport channels, corresponding to the transport layer, stored in advance as a start condition, the threshold change setting unit is started, when the start condition is satisfied by the transport format set decision unit and the number of transport channels decision unit.

* * * * *